Figure 1:
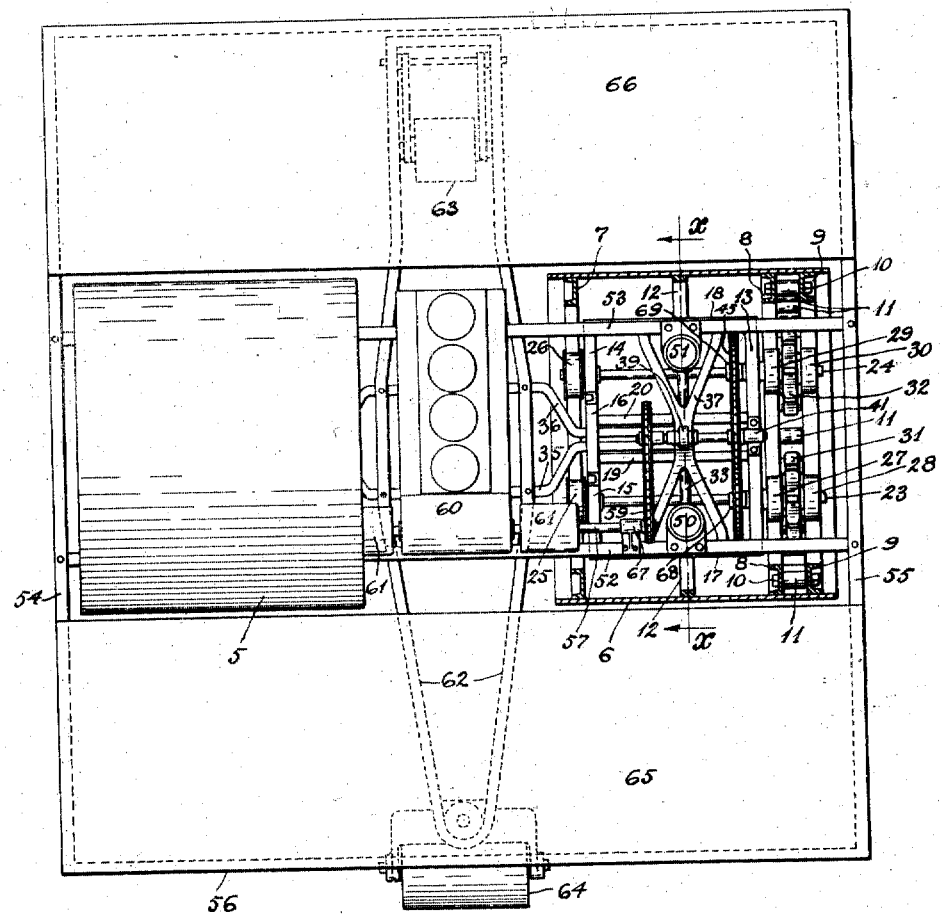

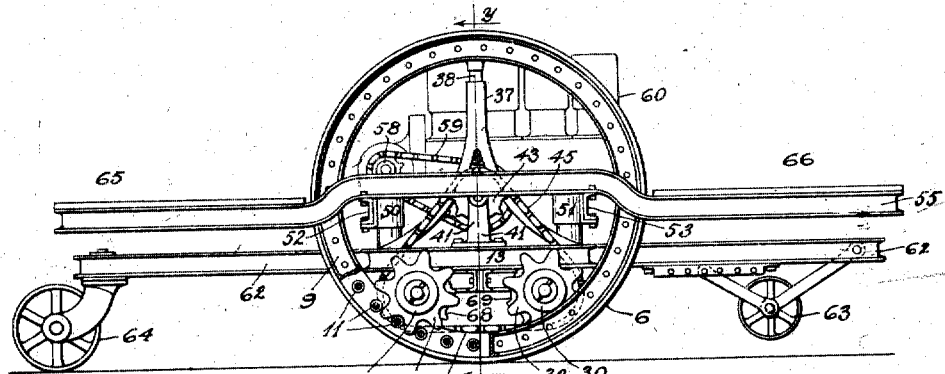
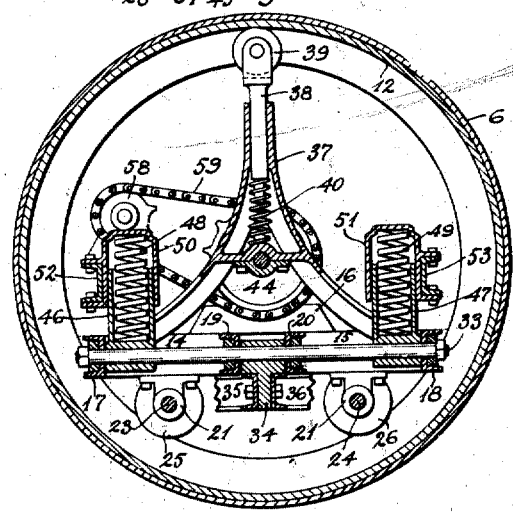
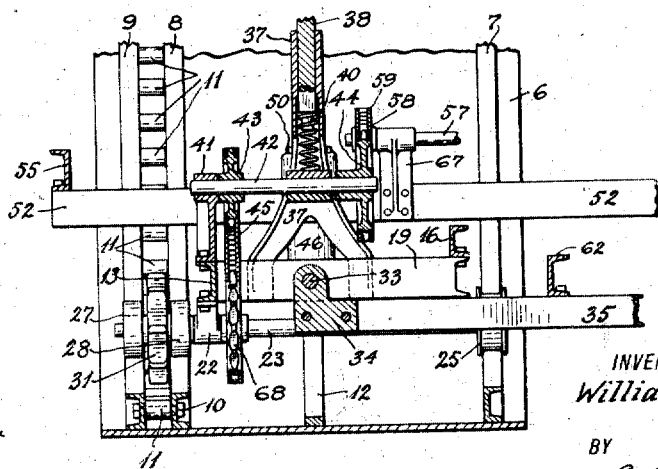

UNITED STATES PATENT OFFICE.

WILLIAM TURNER, OF WENATCHEE, WASHINGTON.

TRACTOR.

1,282,329.  Specification of Letters Patent.  Patented Oct. 22, 1918.

Application filed May 29, 1916. Serial No. 100,668.

*To all whom it may concern:*

Be it known that I, WILLIAM TURNER, citizen of the United States, residing at Wenatchee, in the county of Chelan and State of Washington, have invented a certain new and useful Improvement in Tractors, of which the following is a specification.

My invention relates to improvements in motor vehicles which are adapted to carry freight and to serve as a tractor in the operation of drawing other vehicles, and the object of my invention is to provide a motor vehicle which shall embody a motor, as an internal combustion engine, and two large tractor wheels each independently rotatable, which motor vehicle shall be adapted operatively to travel over soft, rough and uneven ground and to turn in a circle of small radius and which shall be simple in its plan of construction and reliable in its operation.

I accomplish this object by devices illustrated in the accompanying drawings, wherein Figure 1 is a plan view of one form of vehicle embodying my invention showing one of its two tractor wheels in horizontal mid-section; Fig. 2 is a view in side elevation of the same; Fig. 3 is an enlarged view of one of the tractor wheels of the same, in vertical section on broken line $x$, $x$ of Fig. 1; and Fig. 4 is an enlarged view of the same tractor wheel in vertical cross-section on broken line $y$, $y$ of Fig. 2.

Referring to the drawings, throughout which like reference numerals designate like parts, two tractor wheels 5 and 6 of like dimensions each comprising a hollow cylinder whose periphery serves as a tractor surface and each of which is provided with an annular rib 7 that is disposed to project inwardly from its interior surface adjacent to one of its ends and which is further provided with two other similar annular ribs 8 and 9 that are spaced from each other and disposed to project inwardly from its interior surface adjacent to its other end, the internal circular surface of said ribs 7, 8 and 9 serving to form a trackway that may engage with rollers in a manner hereinafter described.

Secured to extend between the annular ribs 8 and 9 are a plurality of equi-distantly spaced bolt-shafts 10 upon each of which is rotatably mounted a section of tube, thus to form one of the teeth 11 of an annular toothed rack whose teeth 11 may engage with gearwheels (which are encircled by said toothed rack) as hereinafter described.

Also, each of the cylinders of the tractor wheels 5 and 6 is provided with an additional annular rib 12 disposed to project from its internal surface at a point equi-distant from its ends, whereby the internal surface of said rib 12 may serve to engage with a roller as hereinafter described.

Disposed within each of the tractor wheels 5 and 6 is a rectangular truck frame having a side rail 13 and an oppositely disposed side rail made of three pieces 14, 15 and 16, the pieces 14 and 15 being connected together by the piece 16 which is bolted to the top surface of the separated end portions of said pieces 14 and 15, as more clearly shown in Fig. 3, said side rails being connected together by end rails 17 and 18 and by cross-bars 19 and 20, all of said rails and cross-bars being made of bars of channel iron secured together by bolts.

Fastened to the bottom surface of each of the side rails of each of said truck frames are bearing brackets, as brackets 21 and 22 within which are rotatably mounted shafts 23 and 24.

Mounted securely on the inner end portions of the shafts 23 and 24 are flanged rollers 25 and 26 respectively, and mounted securely on the outer end portion of each of the shafts 23 and 24 are two rollers, as rollers 27 and 28 and rollers 29 and 30, respectively, and, as more clearly shown in Fig. 1, between the rollers 27 and 28 is mounted a gearwheel 31 and between the rollers 29 and 30 is mounted a gearwheel 32.

The relative positions of the rollers 25, 27 and 28 and gearwheel 31 and the relative positions of the rollers 26, 29 and 30 and gearwheel 32 are such as to adapt the rollers 25 and 26 to engage with and rest upon the annular flange 7, while the rollers 27 and 29 engage with and rest upon the annular flange 8, the rollers 28 and 30 engaging with and resting upon the annular flange 9 while the gearwheels 31 and 32 operatively engage with the teeth 11 of the annular toothed rack whereby a rotation of said gearwheels 31 and 32 will cause the respective one of the tractor wheels 5 and 6 to revolve thus to travel over the surface of the ground.

Extending through and between the end rails 17 and 18 and the cross-bars 19 and 20 of each of the rectangular truck frames is a securely fixed shaft 33, as more clearly shown in Fig. 3, and freely mounted to swing on said shaft 33 at a point between said cross-bars 19 and 20 is an arm 34 which extends downwardly therefrom, and to each of opposite sides of such downwardly extended arm 34 is securely bolted one end of a different one of two beams 35 and 36, of channel iron, which extend between and thus unite the two truck frames disposed within the tractor wheels 5 and 6, said two beams 35 and 36 being offset more widely to separate them from each other to form a supporting frame in that portion of them that extends through the space between said tractor wheels 5 and 6, as more clearly shown in Fig. 1, and thus said tractor wheels 5 and 6 independently may tip in sidewise directions when traveling over uneven surfaces.

Secured to the end rails 17 and 18 of each of the truck frames is a four-legged bracket 37 which extends upwardly, and its upper end portion is formed like a socket within which is slidably disposed a rod 38 whose upper end is bifurcated and provided with a roller 39 which is maintained in engagement with the annular rib 12 by a means of a helical compression spring 40, as shown more clearly in Fig. 3, whereby the rollers of said truck frame are maintained in their respective positions on the annular ribs 7, 8 and 9, and whereby the gearwheels 31 and 32 may not be disengaged from the teeth 11 of the toothed rack.

Securely mounted on the top surface of the rail 13, in the central portion thereof, is a bearing bracket 41, within which is disposed one end porton of a rotatable shaft 42 which extends through and projects beyond a bearing formed in the bracket 37, as more clearly shown in Fig. 4, and mounted securely on said shaft 42 is a sprocket wheel 43 adjacent to said bracket 41, while on the other end portion of said shaft 42, that projects beyond said brackets 37, is securely mounted a sprocket wheel 44.

As more clearly shown in Fig. 2, there is disposed to engage with said sprocket wheel 43 an endless sprocket chain 45 which extends to and engages with both of the sprocket wheels 68 and 69 which are mounted on shafts 23 and 24, whereby said shafts 23 and 24 may be rotated in response to a rotation of the shaft 42.

Freely mounted on each end portion of the shaft 33 of each truck frame to extend upwardly therefrom is a cylindrically formed stud (as studs 46 and 47) which is provided with a concentrically disposed hole which forms a socket within which is confined a helical compression spring (as helical compression springs 48 and 49, respectively) which projects upwardly above the top of said hole yieldingly to support a bracket (as brackets 50 and 51) which bracekt is telescopically associated with the respective one of the studs 46 and 47, as more clearly shown in Fig. 3.

The brackets 50 and 51 are securely bolted respectively to cross-rails 52 and 53, of channel iron, which extend between and unite side bars 54 and 55 of a load frame 56 as more clearly shown in Fig. 1.

Fastened to the cross-rails 52 is a bracket 70 bearing 67 within which is rotatably disposed a shaft 57 upon one end of which is mounted a sprocket wheel 58 which engages with a sprocket chain 59 that is extended to and engages with the sprocket wheel 44, the other end of said shaft 57 being connected with a driving shaft of a motor 60 (as for instance a gas engine) by means of a common form of transmission clutch, as transmission clutches 61, said motor 60 being mounted on the cross-rails 52 and 53 between the tractor wheels 5 and 6 as shown more clearly in Fig. 1.

By suitable well known means not shown the transmission clutches 61 may be operated in a well known manner to control the communication of rotary motion from the motor 60 to the shafts 57 to cause each of said shafts 57 independently to rotate in either direction as may be required at different times.

Secured to the two beams 35 and 36 in a position between the two tractor wheels 5 and 6 is a yoke frame 62, of bars of channel iron, which extends forwardly and rearwardly from said beams 35 and 36 and attached to the under side of the forward end of said frame 62 is a vertically adjustable wheel 63 while to the rearward end of said frame 62 is attached a wheel 64 by means of a bifurcated bracket that is pivotally joined to said frame 62.

Upon the load frame 56 in the front and in the rear of the tractor wheels 5 and 6 is a floor (as floors 65 and 66 respectively) upon which may be placed articles to be transported.

The operation of a vehicle embodying my invention may be described as follows: The motor 60 is started and thereupon the transmission clutches 61 are manipulated to communicate rotary motion in a desired direction to the shafts 57 whereupon the sprocket chains 59 will communicate motion to the shafts 42 to cause the sprocket chains 45 to rotate the shafts 23 and 24 thereby to rotate the gearwheels 31 and 32 which will rotate the tractor wheels 5 and 6, each at the same speed to go in a straight course or each at a different speed to go in a circular course as may be desired.

In its travel each of the tractor wheels 5 and 6 may tip sidewise independently of the other, and the load frame 56 will be yieldingly supported by the helical springs 48 and 49.

The large diameter and great width of the tractor wheels 5 and 6 adapts them to travel over very rough and very soft surfaces with little resistance.

Obviously, changes may be made in the forms, dimensions and arrangement of parts of my invention without departing from the spirit thereof.

What I claim is:

1. A tractor of the class described comprising a yoke frame having a transverse beam, a pair of traction members, and means supported by said traction members and pivotally connected to the ends of the beams to permit each traction member to tilt laterally independently of the other traction member.

2. A tractor of the class described comprising a yoke frame having a transverse beam, a pair of traction members, means supported by said traction members and pivotally connected to the ends of the beams to permit each traction member to tilt laterally independently of the other traction member, an internal rack carried by each traction member, a driving pinion in mesh with each rack, and motor mechanism for driving the pinions.

3. A tractor of the class described comprising a yoke frame having a transverse beam, a pair of traction members, means supported by said traction members and pivotally connected to the ends of the beam to permit each traction member to tilt laterally independently of the other traction member, internal racks carried by said traction members, a pair of driving pinions journaled on said frame and in mesh with said racks, a power shaft, a sprocket driving connection between said power shaft and said pinions, and a motor for operating said power shaft.

4. A tractor including a wheeled yoke frame, rollered trucks tiltably supported thereby, traction wheels within which said trucks are positioned, said traction wheels being provided with internal tracks upon which the rollers of said trucks rest, a load frame yieldingly supported by said trucks, a motor mounted upon said load frame, and driving connections between said motor and said traction wheels.

5. A tractor including a wheeled yoke frame, rollered trucks tiltably supported thereby, traction wheels within which said trucks are positioned, said traction wheels being provided with internal tracks upon which the rollers of said trucks rest, a load frame yieldingly supported by said trucks, a motor mounted upon one of said frames, and driving connections between said motor and said traction wheels carried by said trucks.

6. A tractor including a frame, rollered trucks tiltably supported thereby, traction wheels for supporting said frame and within which said trucks are positioned, the rollers of said trucks being in engagement with the interior faces of said traction wheels, a motor mounted upon said frame, and driving connections between the interior face of said traction wheels and said motor.

7. In a machine of the character described, the combination of rotatable traction members, a member within each traction member adapted to travel thereon, a load carrying member pivotally connected to the members within the traction members to permit the lateral tilting of the traction members.

8. In a machine of the character described, the combination of a rotatable traction member, a load carrying member extending into the traction member and pivotally supported therein to permit the traction member to tilt laterally, and means for rotating the traction member.

9. In a machine of the character described, the combination of a pair of rotatable traction members, a load carrying member connecting the traction members, and pivotally supported thereby, said traction members being free to tilt relatively to the load carrying member, and means carried by each traction member for transmitting motion thereto to drive the same.

10. In a machine of the character described, the combination of a pair of rotatable traction members, a load carrying frame connecting the traction members and extending into and pivotally connected with said traction members to permit a lateral tilting movement thereof relatively to the frame, a motor carried by the frame, and means carried by each traction member for transmitting motion from the motor to the traction members.

11. In a machine of the character described, the combination of a pair of rotatable traction members, a truck member in each traction member provided with wheels adapted to travel within each traction member, and a load carrying frame pivotally connected to the trucks and connecting the traction members.

12. In a machine of the character described, the combination of a pair of rotatable traction drums having interior tracks, a supporting member within each drum provided with wheels to travel upon said tracks, a load carrying frame pivotally connected to said members within the drums to permit the lateral tilting of each drum relatively to the frame, and means carried by each member within each drum for transmitting motion to the drums to drive the same.

13. In a machine of the character described, the combination of a pair of rotatable traction members, a member within each traction member provided with wheels to support said members within the traction members and a load carrying frame connecting the traction members and pivotally connected to the wheel supporting members within the traction members to turn upon an axis transverse to the axis of the traction members and which axis extends longitudinally of the direction of travel of the traction members to permit the same to tilt laterally.

14. In a machine of the character described, the combination of a pair of rotatable traction drums, tracks within the interior of said drums, a truck frame within each drum, wheels on the truck frames to travel upon the tracks, and a load carrying frame pivotally connected to the trucks.

15. In a machine of the character described, the combination of a pair of rotatable traction drums, circular tracks within the drums, supporting members within the drums having wheels to travel upon said tracks, a load carrying frame pivotally connected to each supporting member within each drum, and means upon each supporting member within each drum for transmitting motion to the drums to drive the same.

16. In a machine of the character described, the combination of a pair of rotatable drums having interior circular tracks, a supporting member within each drum having wheels to travel upon said tracks, a yoke frame pivotally connected at its ends to said members, and means within each drum for transmitting motion thereto to drive the same.

17. In a machine of the character described, the combination of a pair of rotatable traction drums, a wheel supported member within each drum to travel upon said tracks, a load carrying frame pivotally attached to said wheel supported members within the drums, and yielding means for supporting the load carrying frame upon said wheel members.

18. In a machine of the character described, the combination of a traction drum, a circular track within the drum, a supporting member, a pair of friction wheels to run upon the track, and carrying the supporting member, a pair of toothed wheels to turn with the friction wheels, and means on the drum along its periphery to be engaged by the toothed wheels.

19. In a machine of the character described, the combination of a pair of rotatable drums, circular tracks within the drums, frames within the drums, axles upon the frames, wheels upon the axles to engage the tracks, toothed wheels upon the axles, means within each drum to be engaged by the toothed wheels for driving the drums, a load carrying frame connecting the frames in the drums, and means for transmitting motion to the axles for the drums.

20. In a machine of the character described, the combination of a traction drum having an extended contact surface, tracks within the drum near each end thereof, a frame, wheels on the frame engaging the tracks, a toothed wheel on the frame, means adjacent the interior surface of the drum adapted to be engaged by the toothed wheel for driving the drum, and means carried by the frame for transmitting motion to the toothed wheel.

21. In a machine of the character described, the combination of a pair of rotatable traction drums having extended contact surfaces, circular tracks within the drums, a frame within each drum, wheels on each frame engaging the tracks, a load carrying frame pivotally connected to the frames in the drums, and means for transmitting motion to each drum independently of the other for driving the drums.

22. In a machine of the character described, the combination of a pair of rotatable traction drums, a truck within each drum for supporting wheels to travel therein, a yoke frame pivotally attached to the trucks and adapted to prevent the forward or rearward tilting of the trucks within the drums, a load carrying frame pivotally supported upon the trucks to turn upon axes coincident with the axes of the pivotal connection of the yoke frame with the trucks, and means carried by each truck independently of the load frame for transmitting motion to each drum to drive the same.

23. In a machine of the character described, the combination of a pair of traction drums having interior circular tracks, a truck frame in each drum having wheels to run upon said tracks, a toothed wheel carried by each truck, means upon the interior surface of each drum adapted to be engaged by said toothed wheels for driving the drums, a yoke frame pivotally connected at its ends to said truck frames, a load carrying frame, yielding means for supporting the load carrying frame upon the trucks, and pivotally attached thereto to turn upon axes coincident with the axes of the pivotal connections of the yoke frame with the trucks, a motor carried by the load frame between the traction drums, and means for transmitting motion from the motor to each toothed wheel within each drum for driving the drums.

In witness whereof I hereunto subscribe my name this 20th day of May, A. D. 1916.

WILLIAM TURNER.

Witnesses:
  Frank Warren,
  A. Haskins.